United States Patent [19]

Simms

[11] 4,169,955
[45] Oct. 2, 1979

[54] MERCAPTOISOCYANATES AND PROCESS FOR PREPARING THE SAME

[75] Inventor: John A. Simms, Wilmington, Del.

[73] Assignee: E. I. Du Pont de Nemours and Company, Wilmington, Del.

[21] Appl. No.: 820,880

[22] Filed: Aug. 1, 1977

[51] Int. Cl.$^2$ .................... C07C 149/26; C07C 69/34
[52] U.S. Cl. ....................................... 560/159; 560/33
[58] Field of Search ......................... 560/159, 33, 115

[56] References Cited

U.S. PATENT DOCUMENTS 3,285,951  11/1966  Heiss ..................................... 560/33
3,984,456  10/1976  Gurthrie ............................. 560/115

Primary Examiner—Werren B. Lone

[57] ABSTRACT

A mercaptoisocyanate having the formula

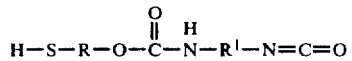

where
R is an alkylene group having 2–6 carbon atoms and
R$^1$ is an aliphatic group, a cycloaliphatic group or an aromatic group;
the mercaptoisocyanate is a useful intermediate for preparing graft copolymers.

6 Claims, No Drawings

MERCAPTOISOCYANATES AND PROCESS FOR PREPARING THE SAME

BACKGROUND OF THE INVENTION

This invention is related to an intermediate useful for preparing graft copolymers.

It has not been possible to prepare certain graft copolymers using conventional polymerization techniques. For example, a polymer prepared by a vinyl addition reaction such as an acrylic polymer could not be grafted to a polymer having reactive isocyanate groups without gelation of the polymers.

The intermediate of this invention is used to prepare a wide variety of graft copolymers which previously could not be prepared.

SUMMARY OF THE INVENTION

A mercaptoisocyanate having the formula

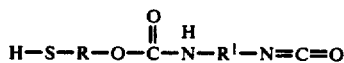

$$H-S-R-O-\overset{O}{\underset{\parallel}{C}}-\overset{H}{\underset{|}{N}}-R^1-N=C=O$$

where

R is an alkylene group having 2-6 carbon atoms
$R^1$ is an aliphatic group, cycloaliphatic group or an aromatic group.

A process for preparing the mercapto isocyanate also is part of this invention.

DESCRIPTION OF THE PREFERRED EMBODIMENT

The mercaptoisocyanate is prepared by reacting one mole of a mercapto alkanol with one mole of an organic diisocyanate at about 50°-150° C. for about 0.5-4 hours. Usually the reaction is in the presence of a solvent and a catalyst.

Typical solvents that are used are as follows: toluene, xylene, butyl acetate, ethyl acetate, acetone, methylethyl ketone, methylisobutyl ketone, and other aromatic hydrocarbons, cycloaliphatic hydrocarbons, ester, ethers, ketones, and other aprotic solvents, i.e., solvents without hydroxyl groups and containing less than 0.1% water.

Typical catalysts that are used are para toluene sulfonic acid, acetic acid and butyl acid phosphate.

In preparing the mercaptoisocyanate, a conventional chemical reactor is used. It is preferred that the reactor have a reflux condenser. To determine when the mercaptoisocyanate preparation is complete, a sample is analyzed by an infrared spectophotometer to measure the amount of unreacted isocyanate groups. Generally, when the absorbence ratio of urethane carbonyl to isocyanate reaches about 0.5, the reaction preparation of the mercaptoisocyanate is complete.

Typical mercapto alkanols that can be used to prepare the mercaptoisocyanate have 2-6 carbon atoms and are as follows: 1,2-mercaptoethanol, 1,2 and 1,3 mercaptopropanol, mercaptoisopropanol, 1,4 mercaptobutanol, mercaptoisobutanol, 1,5 mercaptopentanol, 1,6 mercaptohexanol and the like.

Typical organic diisocyanates that can be used are as follows: isophorone diisocyanate which is 3-isocyanato-methyl-3,5,5-trimethyl-cyclohexyl-isocyanate,
propylene-1,2-diisocyanate,
butylene-1,2-diisocyanate,
butylene-1,3-diisocyanate,
methyl-2,6-diisocyanato caproate hexamethylene diisocyanate,
2,4,4-trimethylhexamethylene diisocyanate,
octamethylene diisocyanate,
2,2,4-trimethylhexamethylene diisocyanate,
nonamethylene diisocyanate,
decamethylene diisocyanate,
2,11-diisocyano-dodecane and the like,
meta-phenylene diisocyanate,
para-phenylene diisocyanate,
toluene-2,4-diisocyanate,
toluene-2,6-diisocyanate,
xylene-2,4-diisocyanate,
xylene-2,6-diisocyanate,
dialkyl benzene diisocyanates, such as methylpropylbenzene diisocyanate, methylethylbenzene diisocyanate, and the like;
2,2'-biphenylene diisocyanate,
3,3'-biphenylene diisocyanate,
4,4'-biphenylene diisocyanate,
3,3'-dimethyl-4,4'-biphenylene diisocyanate, and the like;
methylene-bis-(4-phenyl isocyanate),
ethylene-bis-(4-phenyl isocyanate),
isopropylidene-bis-(4-phenyl isocyanate),
butylene-bis-(4-phenylisocyanate),
hexafluoroisipropylidene-bis-(4-phenyl isocyanate), and the like;
2,2'-oxydiphenyl diisocyanate,
3,3'-oxydiphenyl diisocyanate,
4,4'-oxydiphenyl diisocyanate,
2,2'-ketodiphenyl diisocyanate,
3,3'-ketodiphenyl diisocyanate,
4,4'-ketodiphenyl diisocyanate,
2,2'-thiodiphenyl diisocyanate,
3,3'-thiodiphenyl diisocyanate,
4,4'-thiodiphenyl diisocyanate, and the like;
2,2'-sulfonediphenyl diisocyanate,
3,3'-sulfonediphenyl diisocyanate,
4,4'-sulfonediphenyl diisocyanate, and the like,
2,2'-methylene-bis-(cyclohexyl isocyanate),
3,3'-methylene-bis-(cyclohexyl isocyanate),
4,4'-methylene-bis-(cyclohexyl isocyanate),
4,4'-ethylene-bis-(cyclohexyl isocyanate),
4,4'-propylene-bis-(cyclohexyl isocyanate),
bis-(para-isocyano-cyclohexyl)sulfide,
bis-(para-isocyano-cyclohexyl)sulfone,
bis-(para-isocyano-cyclohexyl)ether,
bis-(para-isocyano-cyclohexyl)diethyl silane,
bis-(para-isocyano-cyclohexyl)diphenyl silane,
bis-(para-isocyano-cyclohexyl)ethyl phosphine oxide,
bis-(para-isocyano-cyclohexyl)phenyl phosphine oxide,
bis-(para-isocyano-cyclohexyl)N-phenyl amine,
bis-(para-isocyano-cyclohexyl)N-methyl amine,
bis-(4-isocyano-phenyl)diethyl silane,
bis-(4-isocyano-phenyl)diphenyl silane,
dichloro-biphenylene diisocyanate,
bis-(4-isocyano-phenyl)ethyl phosphine oxide,
bis-(4-isocyano-phenyl)phenyl phosphine oxide,
bis-(4-isocyano-phenyl)-N-phenyl amine,
bis-(4-isocyano-phenyl)-N-methyl amine,
3,3'-dimethyl-4,4'-diisocyano biphenyl,
3,3'-dimethoxy-biphenylene diisocyanate,
2,4-bis-($\beta$-isocyano-t-butyl)toluene,
bis-(para-$\beta$-isocyano-t-butyl-phenyl)ether, para-bis-(2-methyl-4-isocyano-phenyl)benzene,
para-bis-(1,1-dimethyl-5-amino-pentyl)benzene,
3,3'-diisocyano adamantane,
3,3'-diisocyano biadamantane,
3,3'-diisocyanoethyl-1,1'-biadamantane,
1,2-bis-(3-isocyano-propoxy)ethane,
2,2-dimethyl propylene diisocyanate,
3-methoxy-hexamethylene diisocyanate,
2,5-dimethyl heptamethylene diisocyanate,
5-methyl-nonamethylene diisocyanate,
1,4-diisocyano-cyclohexane,
1,2-diisocyano-octadecane,
2,5-diisocyano-1,3,4-oxadiazole,
$OCN(CH_2)_3O(CH_2)_2O(CH_2)_3NCO$,
$OCN(CH_2)_3S(CH_2)_3NCO$ and

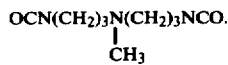

Isophorone diisocyanate and other diisocyanates that have isocyanate groups of different reactivity are preferred since these diisocyanates react rapidly and form a stable mercaptoisocyanate.

One method for utilizing the mercaptoisocyanate is to add the mercaptoisocyanate to a solution of an acrylic polymer having reactive hydroxyl groups usually in the presence of a catalyst to form a mercapto functional polymer. The reaction is carried out at about 80°–130° C. for about 0.5–6 hours. Typical catalysts that can be used are stannous acetate, stannous octoate, dibutyltin oxide and dibutyltin dilaurate.

The mercapto functional polymer is then reacted with other acrylic monomers in the presence of a polymerization catalyst to form a graft copolymer.

The above acrylic polymer used to prepare the mercapto functional polymer is an alkyl methacrylate or acrylate and a hydroxy alkyl acrylate or methacrylate. Typical useful alkyl acrylates and methacrylates are methyl methacrylate, ethyl methacrylate, propyl methacrylate, isopropyl methacrylate, butyl methacrylate, isobutyl methacylate tertiary butyl methacrylate, hexyl methacrylate, 2-ethylhexyl methacrylate, methyl acrylate, ethyl acrylate, propyl acrylate, butyl acrylate, hexylacrylate, octyl acrylate and the like. Typically useful hydroxy alkyl acrylate and methacrylates are hydroxy ethyl acrylate, hydroxy propyl acrylate, hydroxy butyl acrylate, hydroxy ethyl methacrylate, hydroxy propyl methacrylate, hydroxy butyl methacrylate and the like.

Any of the aforementioned acrylates and methacrylates including glycidyl methacrylate, glycidyl acrylate, methacrylic acid, acrylic acid and the like can be reacted with the mercapto functional polymer to form a graft copolymer.

One typical example of the above graft copolymer is as follows: a copolymer of butyl acrylate and about 1–30% by weight of hydroxy ethyl acrylate is reacted with a mercaptoisocyanate to form a mercapto functional polymer. This polymer then can be reacted in the presence of a polymerization catalyst with an alkyl acrylate or methacrylate such as methyl methacrylate to form a graft copolymer that is tough and durable.

A number of different hydroxyl functional polymers can be reacted with the mercaptoisocyanate to form a mercapto functional polymer. Typical hydroxy functional polymers are styrene/allyl alcohol polymers, cellulosic polymers such as cellulose acetate butyrate and cellulose acetate propionate, hydroxyl functional polyesters, hydroxyl functional epoxy esters, and the like. The mercapto functional polymers then can be reacted as described above with ethylenically unsaturated monomers to form a graft copolymer.

The following Examples illustrate the invention. All quantities are on a weight basis unless otherwise indicated.

EXAMPLE 1

The following constituents are changed into a reaction vessel equipped with a stirrer, a thermometer, and a reflux condenser.

| Portion 1 | |
|---|---|
| Toluene | 100.00g |
| p toluene sulfonic acid | 0.01g |
| 2-mercapto ethanol | 2.35g |
| Portion 2 | |
| Isophorone diisocyanate | 6.70g |

Portion 1 is changed into the reaction vessel and the resulting mixture is covered with nitrogen and heated to its reflux temperature for about 1 hour and 15 minutes and then cooled to room temperature. Portion 2 is added and the reaction mixture is heated to its reflux temperature for about 1½ hours and a sample is removed and tested for the presence of unreacted isocyanate groups with an infrared spectophotometer. If isocyanate groups are detected, reaction is continued for an additional 30 minutes.

The resulting solution contains 8.25% solids of the mercaptoisocyanate.

The following Examples 2–4 were not carried out in the laboratory. However, it is believed that in each of the Examples a mercaptoisocyanate will be formed as indicated.

EXAMPLE 2

The following constituents are charged into a reaction vessel equipped with a stirrer, a thermometer and a reflux condenser:

| Portion 1 | |
|---|---|
| Toluene | 100.00g |
| p toluene sulfonic acid | 0.01g |
| 2-mercapto ethanol | 2.35g |
| Portion 2 | |
| Methyl 2,6-diisocyanotocaproate | 6.4 g |

Portion 1 is changed into the reaction vessel and is dried azeotropically by heating portion 1 to its reflux temperature and holding portion 1 at this temperature for 5 minutes. Portion 2 is then added and the resulting mixture heated for one hour at 110° C. The resulting solution contains 8.1% solids of a mercaptoisocyanate.

EXAMPLE 3

The following constituents are changed in the order listed into a reaction vessel equipped with a stirrer, a thermomether, and a reflux condenser.

| Toluene | 100.0 | g |
|---|---|---|
| Butyl Acid phosphate | 0.10 | g |
| 2 mercapto ethanol | 3.0 | g |
| Toluene 2,4-diisocyanate | 6.7 | g |

The resulting mixture is heated to 50° and held at this temperature for 6 hours. The resulting solution contains 8.8% solids of the mercaptoisocyanate.

EXAMPLE 4

The following constituents are changed in one order listed into a reaction vessel equipped with a stirrer, a thermometer and a reflux condenser.

| | | |
|---|---|---|
| heptane | 100 | g |
| phenyl acid phosphate | 0.01 | g |
| 2-mercapto ethanol | 3.0 | g |
| hexamethylenediisocyanate | 19.4 | g |

The mixture is heated to its reflux temperature and refluxed for 2 hours. Upon cooling an oily layer of mercaptoisocyanate separates from the mixture. This layer is removed and is washed 2 times with 50 gram portions of heptane to remove excess hexamethylene diisocyanate. The resulting product is a mercaptoisocyanate.

I claim:

1. A mercaptoisocyanate having the formula

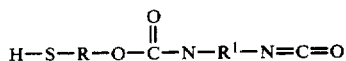

wherein
R is an alkylene group having 2-6 carbon atoms and
$R^1$ is the residual from an organic diisocyanate, wherein the organic diisocyanate is selected from the group consisting of isophorone diisocyanate,
propylene diisocyanate,
butylene diisocyanate,
methyl diisocyanato caproate,
hexamethylene diisocyanate,
trimethylhexamethylene diisocyanate,
octamethylene diisocyanate,
nonamethylene diisocyanate,
decamethylene diisocyanate,
diisocyano-dodecane,
phenylene diisocyanate,
toluene diisocyanate,
xylene diisocyanate,
dialkyl benzene diisocyanate,
biphenylene diisocyanate,
dimethyl biphenylene diisocyanate,
methylene-bis-(phenyl isocyanate),
ethylene-bis-(phenyl isocyanate),
isopropylidene-bis-(phenyl isocyanate),
butylene-bis-(phenyl isocyanate),
hexafluoroisopropylidene-bis-(phenyl isocyanate)
oxydiphenyl diisocyanate,
ketodiphenyl diisocyanate,
thiodiphenyl diisocyanate,
sulfone diphenyl diisocyanate,
methylene-bis-(cyclohexyl isocyanate),
propylene-bis-(cyclohexyl isocyanate),
bis-(para-isocyano-cyclohexyl)sulfide,
bis-(para-isocyano-cyclohexyl)sulfone,
bis-(para-isocyano-cyclohexyl)ether,
bis-(para-isocyano-cyclohexyl)diethyl silane,
bis-(para-isocyano-cyclohexyl)diphenyl silane,
bis-(para-isocyano-cyclohexyl)ethyl phosphine oxide,
bis-(para-isocyano-cyclohexyl)phenyl phosphine oxide,
bis-(para-isocyano-cyclohexyl)N-phenyl amine,
bis-(para-isocyano-cyclohexyl)N-methyl amine,
bis-(isocyano-phenyl)diethyl silane,
bis-(isocyano-phenyl)diphenyl silane,
dichloro-biphenylene diisocyanate,
bis-(isocyano-phenyl)ethyl phosphine oxide,
bis-(isocyano-phenyl)phenyl phosphine oxide,
bis-(isocyano-phenyl)-N-phenyl amine,
bis-(isocyano-phenyl)-N-methyl amine,
dimethyl diisocyano biphenyl,
dimethoxy biphenylene diisocyante,
bis-(isocyano butyl)toluene,
bis-(para-β-isocyano-t-butyl-phenyl)ether,
para-bis-(methyl isocyano phenyl)benzene,
para-bis-(dimethyl amino pentyl)benzene,
diisocyano adamantane,
diisocyano biadamantane,
diisocyanoethyl-biadamantane,
bis-(isocyano propoxy)ethane,
dimethyl propylene diisocyanate,
methoxy hexamethylene diisocyanate,
dimethyl heptamethylene diisocyanate,
methyl nonamethylene diisocyanate,
diisocyano cyclohexane,
diisocyano octadecane,
diisocyano oxadiazole,
$OCN(CH_2)_3O(CH_2)_2O(CH_2)_3NCO$,
$OCN(CH_2)_3S(CH_2)_3NCO$,

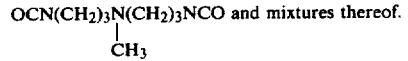

and mixtures thereof.

2. The mercaptoisocyanate of claim 1 in which R is $[CH_2]_2$.

3. The mercaptoisocyanate of claim 2 in which $R^1$ is from hexamethylene diisocyanate.

4. The mercaptoisocyanate of claim 2 in which $R^1$ is from 3-isocyanato-methyl-3,5,5-trimethyl cyclohexyl isocyanate.

5. The mercaptoisocyanate of claim 2 in which $R^1$ is from methyl diisocyanato caproate.

6. The mercaptoisocyanate of claim 2 in which $R^1$ is from toluene diisocyanate.

* * * * *